(12) United States Patent
Miller (10) Patent No.: US 7,350,459 B2
(45) Date of Patent: Apr. 1, 2008

(54) FOLIAGE COMPACTOR

(76) Inventor: Grover Miller, 5712 Riverview Rd., Peninsula, OH (US) 44264

( * ) Notice: Subject to any disclaimer, the term of this patent is extended or adjusted under 35 U.S.C. 154(b) by 0 days.

(21) Appl. No.: 11/710,832

(22) Filed: Feb. 26, 2007

(65) Prior Publication Data

US 2007/0157825 A1    Jul. 12, 2007

Related U.S. Application Data

(63) Continuation-in-part of application No. 11/033,650, filed on Jan. 12, 2005, now abandoned.

(51) Int. Cl.
*B65B 13/20* (2006.01)

(52) U.S. Cl. .................. 100/3; 100/19 R; 100/100; 100/102; 100/178; 100/215; 100/242; 100/245; 100/269.01

(58) Field of Classification Search .............. 100/3, 100/17, 24, 43, 177, 178, 179, 191, 192, 100/214, 215, 229 R, 240, 242, 245, 269.01, 100/19 R, 100, 102; 56/12.8, 12.9, 17.3, 56/17.5
See application file for complete search history.

(56) References Cited

U.S. PATENT DOCUMENTS

| | | | | |
|---|---|---|---|---|
| 206,865 A | * | 8/1878 | Dederick | 100/3 |
| 1,100,592 A | * | 6/1914 | Madden | 100/99 |
| 2,037,211 A | * | 4/1936 | Campbell | 100/3 |
| 2,634,840 A | * | 4/1953 | Bornzin | 192/26 |
| 2,853,000 A | * | 9/1958 | Russell | 100/19 A |
| 4,150,613 A | * | 4/1979 | Smee et al. | 100/3 |
| 4,167,902 A | * | 9/1979 | Bister et al. | 100/3 |
| 4,443,997 A | * | 4/1984 | Namdari | 56/13.3 |
| 4,881,362 A | * | 11/1989 | Parker et al. | 56/202 |
| 5,768,744 A | * | 6/1998 | Hamilton | 15/340.1 |

* cited by examiner

*Primary Examiner*—Jimmy T. Nguyen
(74) *Attorney, Agent, or Firm*—Brouse McDowell, LPA (57) ABSTRACT

An organic foliage compactor for compacting organic foliage into a bale is disclosed. The compactor includes a compactor frame and a compacting tube coupled to the compactor frame. The compacting tube includes a first end, a second end and a housing that defines an interior passage extending between the first end and the second end through which the organic foliage is urged to compact the organic foliage. A feed tube to which the organic foliage is to be introduced is in communication with the compacting tube. A driver provides an urging force to be imparted on organic foliage introduced to the feed tube, and a platen is operatively coupled to the driver for urging organic foliage introduced to the feed tube into the compacting tube where it is compacted as the organic foliage progresses through the interior passage defined by the housing between the first end and the second end of the compacting tube as a substantially steady-state process. A control device is also included to control a direction in which the platen travels relative to the compacting tube.

15 Claims, 6 Drawing Sheets

FOLIAGE COMPACTOR

CROSS-REFERENCE TO RELATED APPLICATIONS

This application is a continuation-in-part of U.S. patent application Ser. No. 11/033,650, filed on Jan. 12, 2005, now abandoned.

BACKGROUND OF THE INVENTION

1. Field of the Invention

The present invention is directed generally to a method and apparatus for compacting foliage, and more specifically, to a mobile foliage compactor and method for compacting organic foliage into compact bales to minimize the volume occupied by foliage being disposed of.

2. Description of Related Art

Grass clippings, leaves, twigs that have fallen from trees, and other such organic foliage create an unsightly appearance when they accumulate on yards and parks. Such organic foliage is collected by home owners and landscapers and placed in bags that are placed adjacent to public roadways from where the bags are collected by municipalities. Other municipalities offer collection services where loose organic foliage piled by the public roadways is vacuumed by large collection vehicles. But regardless of whether the organic foliage is bagged, it occupies large volumes of storage space in collection vehicles and composting facilities.

To minimize the volume required to transport and store collected organic foliage, attempts have been made to develop devices that compact this material. However, such known devices are typically owned by the municipalities, are quite large and conduct the compacting operations when the organic foliage is collected. For example, one complex foliage compactor imparts a compressive force on organic foliage placed in a hopper. However, this compressive force is imparted on the organic foliage by a vertical piston that presses downwardly on the organic foliage, which is squeezed between the piston and a bottom surface of the hopper. The complexity and cost of such devices make them impractical for use in commercial and residential settings.

Accordingly, there is a need in the art for a foliage compactor that is practical for small commercial and residential users that can minimize the volume of organic foliage. It is desirable to maximize the density of the resulting bales of organic foliage to minimize costs since storage and shipping fees are based on volume rather than weight. The foliage compactor can optionally be mobile to be towed by a conventional landscaping vehicle, and can optionally include a feature allowing each bale to be bound for enhancing handling of each bale. Further, the foliage compactor can optionally include a variety of inputs into which organic foliage can be inserted into the foliage compactor.

SUMMARY OF THE INVENTION

According to one aspect, the present invention provides an organic foliage compactor for compacting organic foliage into a bale. The compactor includes a compactor frame and a compacting tube coupled to the compactor frame. The compacting tube includes a first end, a second end and a housing that defines an interior passage extending between the first end and the second end through which the organic foliage is urged to compact the organic foliage. A feed tube to which the organic foliage is to be introduced is in communication with the compacting tube. A driver provides an urging force to be imparted on organic foliage introduced to the feed tube, and a platen is operatively coupled to the driver for urging organic foliage introduced to the feed tube into the compacting tube where it is compacted as the organic foliage progresses through the interior passage defined by the housing between the first end and the second end of the compacting tube as a substantially steady-state process. A control device is also included to control a direction in which the platen travels relative to the compacting tube.

According to another aspect, the present invention provides a driver in the form of a hydraulic cylinder to which the platen is operatively coupled adjacent to an end of a piston that can extend from and retract at least partially into the hydraulic cylinder. An on-board internal combustion engine that includes at least one power output drives a hydraulic pump that is operatively coupled to the at least one power output to pump hydraulic fluid into the hydraulic cylinder. A bidirectional hydraulic control valve can be provided to facilitate reciprocation of the piston within the hydraulic cylinder between retracted and extended positions. The reciprocation of the piston within the hydraulic cylinder caused by the control valve is optionally repeated substantially continuously and automatically without intervention by an operator.

According to another aspect, the present invention provides an optional vacuum source operatively coupled to the organic foliage compactor to inhale organic foliage and provide the necessary energy to transport the inhaled organic foliage to the feed tube. The vacuum pump includes a vacuum input through which the organic foliage is inhaled and a vacuum output in fluid communication with the feed tube through which inhaled organic foliage is discharged and introduced to the feed tube. A foliage conduit extends between a first end in communication with the feed tube and a second end to be coupled to an output of a mower deck provided to a lawn tractor to transport organic foliage discharged from the output of the mower deck to the feed tube. An optional booster can be provided for transporting organic foliage that would not otherwise reach the feed tube through the foliage conduit into the feed tube from the foliage conduit.

According to yet another aspect, the present invention provides a an open-ended hopper provided to the feed tube through which organic foliage can be introduced manually in batches to the feed tube. The hopper can optionally include a tapered shape with an outermost aperture through which organic foliage is introduced to the foliage compactor is larger than an inner aperture in communication with the feed tube through which organic foliage enters the feed tube.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION OF ILLUSTRATIVE EMBODIMENTS

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

Figure 1:
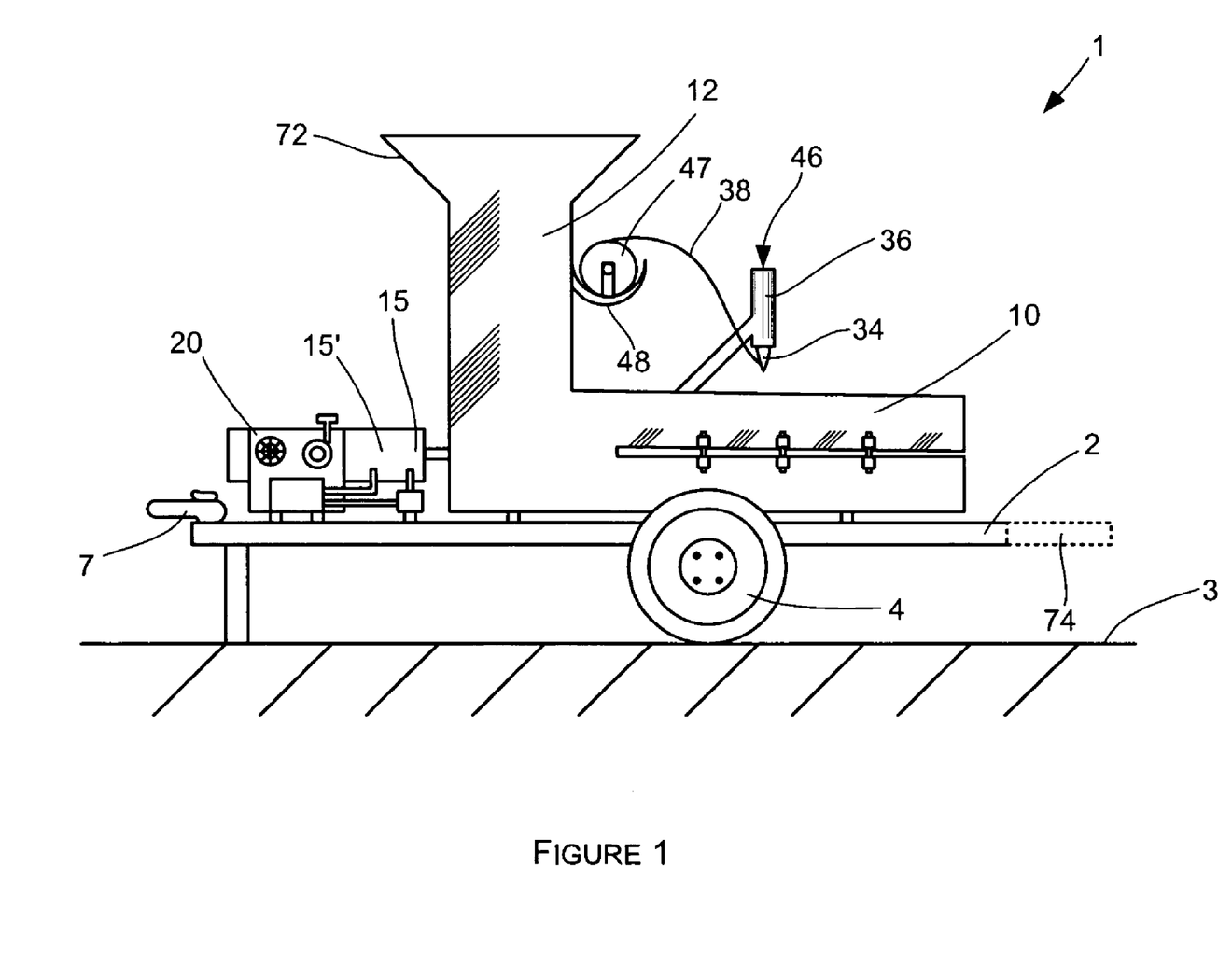
FIG. 1 is a side view of a foliage compactor in accordance with an aspect of the present invention.

FIG. 1 shows an embodiment of a mobile foliage compactor 1 for compacting organic foliage into one or more bales (not shown). The foliage compactor 1 includes a frame 2 having one or more ground-engaging wheels 4 to allow the foliage compactor to be rolled over the ground 3 from one location to another during use. To facilitate releasably coupling the foliage compactor 1 to a tow vehicle 41 (FIG. 6) such as a riding lawn tractor, an end of the frame 2 can optionally include a hitch 7 for cooperating with a towing ball (not shown) secured adjacent to a rearward portion of the tow vehicle 41. Although the hitch 7 was described as being compatible with a ball connector, the hitch 7 can be compatible with any type of connector provided to the tow vehicle 41, such as a pintle hook and the like for releasably coupling a trailer to a tow vehicle. Further, the size and ratings of the hitch 7, wheels 4 and other features that facilitate transportation of the foliage compactor 1 can be selected with sound engineering judgment to facilitate safe transportation of the foliage compactor 1. Thus, large industrial embodiments of the foliage compactor 1 can be equipped with a large hitch 7 with significant towing capacities in excess of the gross weight of the foliage compactor 1. Example towing capacities include, but are not limited to, 1000 lbs, 2000 lbs, 3000 lbs, 4000 lbs, 5000 lbs, 6000 lbs, and so on, upwards of and beyond capacities of 10000 lbs.

The foliage compactor 1 additionally includes a compacting tube 10 operatively coupled to, and in communication with an adjacent foliage feed tube 12. Each of the compacting tube 10 and the feed tube 12 are conduits that define an interior passage through which organic foliage travels as it is formed into a bale. An inlet of the compacting tube 10 is in communication with an outlet of the feed tube 12. Foliage or other organic debris entering the feed tube 12 is to be channeled to the compacting tube 10 where a compacting device, such as a platen 18, may be cycled back and forth for use in compacting the organic foliage, as will be discussed in detail below. Each of the compacting tube 10 and the feed tube 12 can be independently formed from a suitably-durable material such as a metal, metal alloy, plastic and the like. Optionally, the compacting tube 10 and the feed tube 12 can be integrally formed as a unit from a common metallic material. Examples of suitably-strong materials from which the compacting tube 10 and the feed tube 12 can be fabricated include, but are not limited to, steel, stainless steel, aluminum, and the like.

A driver 15 is also included for imparting the driving force on the platen 18 or other compacting device to cycle the platen 18 in and out of the compacting tube 10. Although the compacting device is described from this point forward as a platen 18, it is to be noted that the compacting device can be any type of structure for pressing against organic foliage to form a bale. The driver 15 can be any device such as a hydraulic cylinder for applying the forces required to operate the platen 18 and compact the organic foliage into a bale.

References to organic foliage herein are understood to mean grass clippings, leaves, weeds, small twigs that have been broken from a tree, portions of garden plants, and any other plant material. Further, a combination of any of these materials can be included in the organic foliage compacted by the foliage compactor 1 to form a bale in accordance with embodiments of the present invention.

Each bale formed by the foliage compactor 1 can take on a shape that approximates the interior dimensions of the compacting tube 10. For example, a compacting tube 10 with a generally rectangular cross-sectional shape, such as that illustrated in FIG. 3, will produce substantially-rectangular bales of organic debris. The density and degree of compaction of the organic foliage can be varied as desired by adjusting the taper angle of the compacting tube 10, the compressive force exerted by one or more surfaces of the compacting tube 10 on the organic debris therein, and a combination thereof. Varying the density of bales formed by the foliage compactor 1 is described in detail below.

The foliage compactor 1 can also optionally be equipped with a binder 46 for inserting a binding cord 38 through a bale as it exits the compacting tube 10. According to an embodiment of the present invention, the binder 46 can include a hydraulically-actuated rod 34 with a point at a leading end thereof disposed within a sleeve 36 that allows the rod 34 to be moved between first and second positions. A binding cord 38 is releasably coupled to a hook portion 35 (FIG. 3) or other feature adjacent to the point of the rod 34 so the binding cord 38 can be inserted through the bale as the rod 34 is hydraulically driven from the first position, through the bale, and to the second position. According to an embodiment of the invention, the binding cord 38 is releasably coupled to the hook portion 35 in a manner analogous to a string inserted through the eye of a needle. In FIG. 1, the rod 34 is positioned such that the point is outside the compacting tube 10 and above an aperture 31 (also referred to herein as a slit 31) formed in the compacting tube 10 discussed below with respect to FIG. 3. In the first position, the rod 34 is sufficiently retracted within the sleeve 36 to permit the bale exiting the compacting tube 10 to exit the compacting tube 10 without contacting the rod 34.

In the second position, the rod 34 may be inserted or driven through the slit 31, into the compacting tube 10, and out the opposite side of the compacting tube 10. In this manner, the rod 34 and the binding cord 38 are inserted into the bale of compacted organic foliage. With the rod 34 in the second position, the binding cord 38 can be grasped by an operator of the foliage compactor 1, wrapped around a leading end of the bale and tied to a portion of the binding cord adjacent to a location where the binding cord 38 enters the bale.

The sleeve 36 is fixedly connected to the frame 2 or compacting tube 10 via welding, fasteners or any other connector chosen with sound engineering judgment. And although described above as a hook portion 35, the feature for receiving the binding cord 38 can be an eyelet, clasp, or any other releasable connector suitable for coupling the binding cord 38 to the arm 34 to be inserted through the bale. Further, the binding cord 38 can be any suitably strong filament, such as burlap twine, string, wire and the like, and can be dispensed from a spool 47 coupled to the foliage compactor 1. The spool 47 can be supported within a cradle 48, on a roller, or by any other suitable method.

Figure 6:
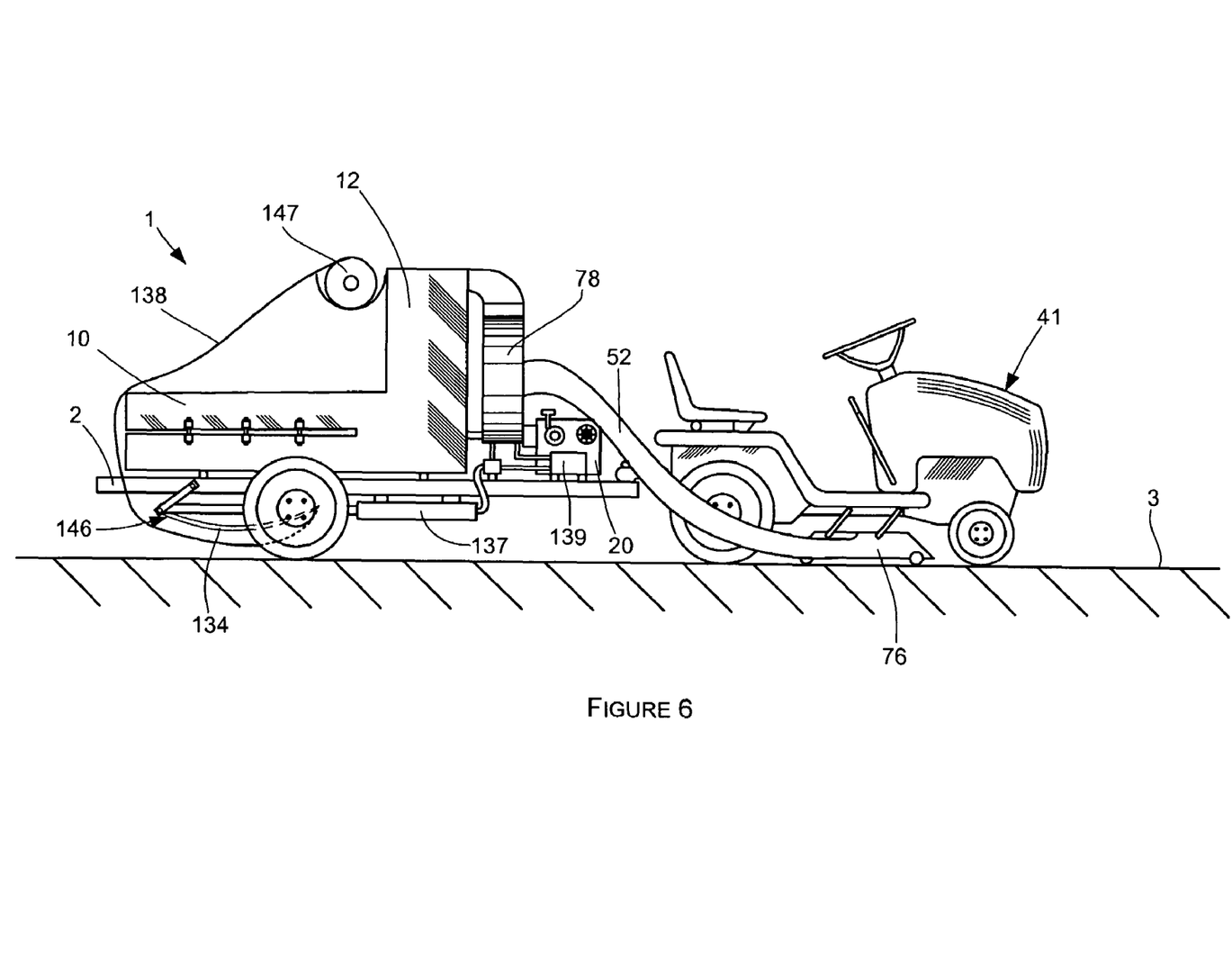
FIG. 6 is a side view of a foliage compactor operatively coupled to a tow vehicle in accordance with an aspect of the present invention.

According to an alternate embodiment shown in FIG. 6, the binder 146 includes an arcuate arm 134 that is pivotally mounted to an underside of the frame 2. Similar to the arm 34 in the illustrative embodiment shown in FIG. 1, the arm 134 in FIG. 6 is also hydraulically driven by a hydraulic cylinder 137 that is also coupled to the underside of the frame 2. The hydraulic cylinder 137 is operatively coupled to a reservoir 139 of hydraulic fluid and the engine 20 to extend and retract the arm 134. A point is also formed adjacent to a leading end of the arm 134 to ease the insertion of the arm 134 upwardly through a slit 31 (FIG. 3) formed in the compacting tube 10, and further upwards through the bale. When the point at the end of the arm 134 breaches the uppermost surface of the bale, the binding cord 138 coupled thereto can be tied to a portion of the string extending about the bale from a spool 147 to hold the bale's shape and facilitate manual handling of the bale.

Figure 2:
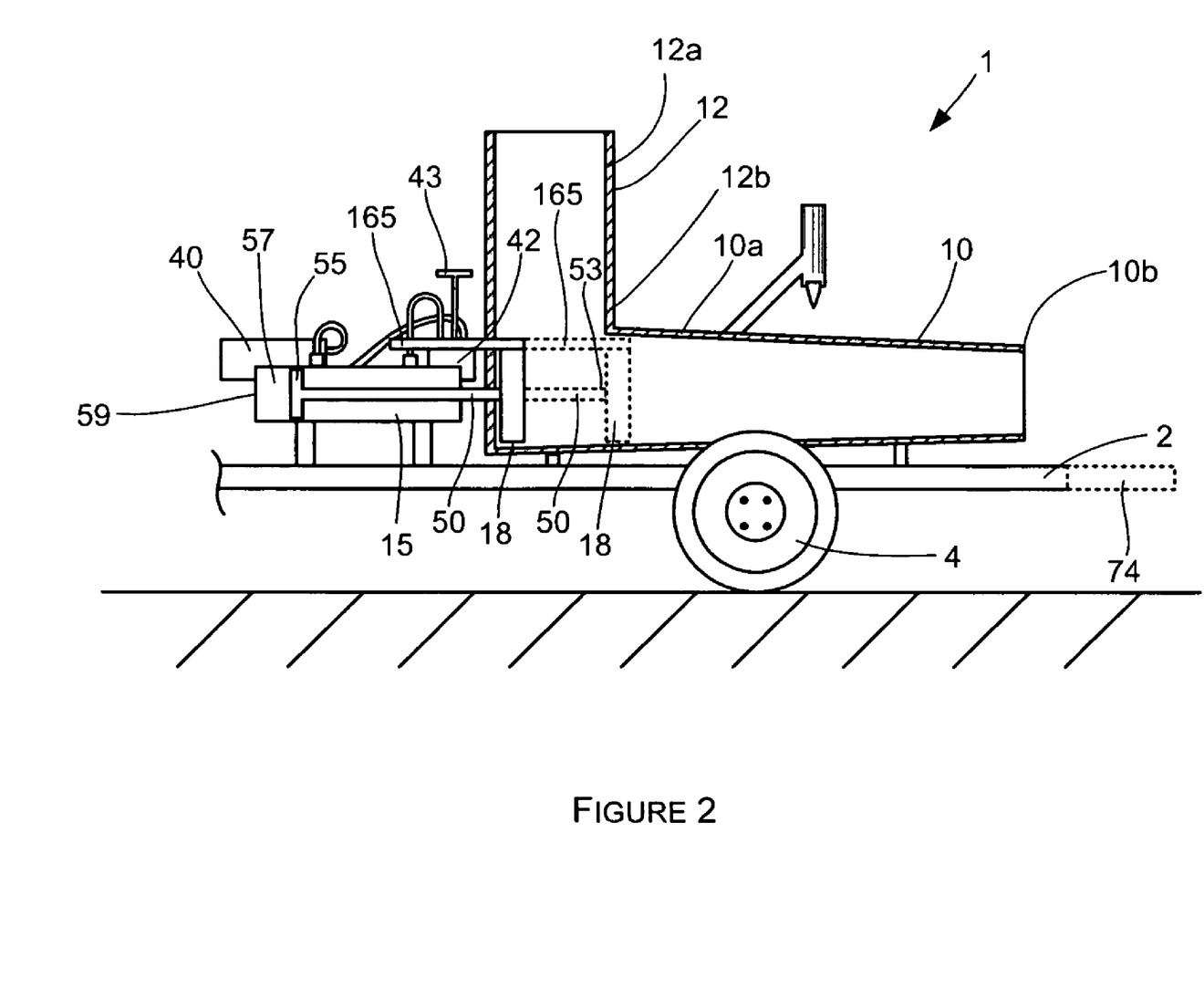
FIG. 2 is a partially cutaway view of a foliage compactor in accordance with an aspect of the present invention.

With reference once again to FIG. 1 and now to FIG. 2, a cross section of the feed tube 12 and the compacting tube 10 is shown. The feed tube 12 includes first 12a and second 12b ends, and likewise, the compacting tube 10 also includes first 10a and second 10b ends. As shown, the feed tube 12 forms an angle of approximately ninety degrees (90°) relative to the compacting tube 10, wherein the feed tube 12 is positioned substantially vertically and the compacting tube 10 is positioned substantially horizontally. However, any angle and orientation of feed tube 12 relative to the compacting tube 10 may be chosen with sound engineering judgment to permit the transfer of organic foliage from the feed tube 12 to the compacting tube 10. And as mentioned above, the feed tube 12 and compacting tube 10 are presently described separately, but the scope of the present invention includes a feed tube 12 and compacting tube 10 integrally formed as a single piece.

The platen 18 is disposed within the compacting tube 10 to travel between a retracted position (shown in solid lines in FIG. 2) and an extended position (shown by broken lines in FIG. 2), and back again. The platen 18 is a substantially planar sheet of a suitably rigid material such as a metal or metal alloy that can push organic foliage introduced to the reed tube 12 into the compacting tube 10. Although a hydraulic cylinder in FIG. 2 acts as the driver 15, other prime movers such as a system of gears, an auger, and any other suitable driver 15 capable of extending and retracting the platen 18 within the compacting tube 10 is within the scope of the present invention. The platen 18 shown in broken lines in FIG. 2 can be considered to be only partially inserted into the compacting tube 10 towards its extended position, or alternately, fully extended into the compacting tube 10. The extent to which the platen 18 is extended into the compacting tube 10 in its fully extended position can vary by embodiment. Some embodiments, however, include a platen 18 that is in its fully extended position short of the second end 10b of the compacting tube 10.

The hydraulic cylinder driver 15 includes a hydraulic piston 50 that is substantially concentrically disposed within the hydraulic cylinder driver 15. An outward end 53 of the piston 50 that is operatively coupled to the platen 18 extends out beyond the hydraulic cylinder driver 15. An inward end 55 of the piston 50 is disposed within the hydraulic cylinder driver 15 to be acted upon by hydraulic fluid therein to adjust the position of the platen 18. Hydraulic fluid can be pumped by the hydraulic pump 40 into a cavity 57 defined between the inward end 55 of the piston 50 and a terminal end 59 of the hydraulic cylinder driver 15. The uncompressible nature of hydraulic fluid being pumped into the cavity 57 elevates the pressure exerted by the fluid in the cavity 57 on the inward end 55 of the piston 50, thereby urging the piston 50 outwardly from the hydraulic cylinder driver 15 and extending the platen 18 generally toward the second end 10b of the compacting tube 10.

Depending on the length of the hydraulic piston 50, the platen can be extended sufficiently into the compacting tube 10 to expel compacted organic foliage from the second end 10b thereof. However, as mentioned above, the platen 18 can optionally reach its fully extended position short of the second end 10b of the compacting tube 10. For such embodiments the organic foliage is compacted within the compacting tube 10 and expelled from the second end 10b of the compacting tube 10 by the reciprocating action of the platen 18. As with the other hydraulic actuators of the foliage compactor 1, an internal combustion, or other type of engine 20 secured to the frame 2 drives a system including one or more hydraulic pumps 40 to operate each hydraulic cylinder. FIG. 2 shows an embodiment of the foliage compactor 1 that is partially cut away, however, to clearly illustrate aspects of the present invention. The engine 20 is among the features removed to illustrate other components of the foliage compactor 1.

A substantially-horizontal and planar shield 165 is coupled adjacent to an upper portion of the platen 18 to minimize the organic foliage that can be introduced to the compacting tube 10 from the feed tube 12 when the platen 18 is in the extended position. Minimizing the amount of organic foliage introduced into the compacting tube 10 in this manner minimizes the amount of organic foliage falling between the hydraulic cylinder 15 or other driver and the platen 18. This prevents the compaction of organic foliage between the proximate end of the compacting tube 10 and the platen 18, which could limit the range of motion of the platen 18 between its extended and retracted positions as discussed in detail below. The shield 165 can optionally be fabricated from a metallic material, along with the platen 18, and can be welded or otherwise coupled to the platen 18 in an orientation that interferes with the transportation of organic foliage from the feed tube 12 and the compacting tube 10. In FIGS. 2 and 4A-4C, the shield 165 is welded to the platen 18 in an orientation that is substantially perpendicular to the direction in which organic foliage travels through the feed tube 12 to reach the compacting tube 10. When the platen 18 is adjusted to its retracted position, excess portions of the shield 165 can extend through an aperture formed in the feed tube 12. When the platen 18 is adjusted to its extended position, however, the shield 165 is sized to obstruct the passage of organic foliage through at least a majority of the aperture forming the entrance into the compacting tube 10 from the feed tube 12. Thus, the communication of organic foliage from the feed tube 12 into the compacting tube 10 is temporarily interrupted while the platen 18 is in the extended position. The degree of the interference with the transportation of organic foliage from the feed tube 12 to the compacting tube 10 can be a function of the position of the platen 18 between the extended and retracted positions. With the platen 18 in the extended position, the entrance to the compacting tube 10 can be substantially closed off, while the entrance to the compacting tube 10 can be substantially open when the platen 18 is in the retracted position.

The reciprocating-platen 18 embodiment of the foliage compactor 1 in FIG. 2 utilizes the engine 20 to drive one or more of the hydraulic pumps 40 to actuate the hydraulic cylinder driver 15 that reciprocally adjusts the position of the platen 18 relative to the compacting tube 10. A bidirectional hydraulic control valve is an embodiment of a control unit that can optionally be connected within the hydraulic fluid circuit between the hydraulic pump 40 and the hydraulic cylinder 15. The control valve 42 includes a gate 43 that can be selectively adjusted to direct the desired flow of hydraulic between the reservoir 139 (FIG. 6) and the cavity 57 of the hydraulic cylinder serving as the driver 15 as appropriate to reciprocate the insertion and removal of the piston 50 to and from the hydraulic cylinder driver 15. Adjustment of the gate 43 can be automatic and caused by a controller provided to the foliage compactor 1 without intervention from an operator, or manually and caused by the operator of the foliage compactor 1 to bring about the reciprocating action of the platen 18. Controlling the gate 43 also allows for control of the speed that the piston 50 travels relative to the hydraulic cylinder driver 15.

In use, organic foliage is introduced to the feed tube 12 according to any of the methods described herein and falls under the influence of gravity or is otherwise placed between the platen 18 and the second end 10b of the compacting tube 10. The gate 43 of the control valve 42 is adjusted to a first position which directs hydraulic fluid pumped from the reservoir 139 into the cavity 57 between the terminal end 59 of the hydraulic cylinder driver 15 and the inward end 55 of the piston 50. As hydraulic fluid is pumped into the cavity 57 the pressure exerted on the inward end 55 of the piston 50 causes the piston 50 to be expelled from the hydraulic cylinder driver 15, thereby urging the platen 18 generally towards the second end 10b of the compacting tube 10. Urging the platen 18 towards the second end 10b causes the platen 18 to contact and compact the organic foliage introduced to the feed tube 12 into the compacting tube 10.

After the platen 18 is adjusted a desired distance toward the second end 10b of the compacting tube 10 the platen is adjusted reward, generally away from the second end 10b of the compacting tube 10 and towards its retracted position, the gate 43 is adjusted to cause retraction of the piston 50 into the hydraulic cylinder driver 15. Retraction of the piston 50 into the hydraulic cylinder driver 15 from the extended position can be accomplished by: directing hydraulic fluid with the control valve 42 out of the cavity 57 and back to the reservoir 139, by adjusting the gate 43 of the control valve to direct hydraulic fluid into the hydraulic cylinder driver 15 on the opposite side of the inward end 55 of the piston 50, and the like. When the platen 18 is returned to its retracted position, the organic foliage compacted into the compacting tube 10 remains at approximately the same location it was at when the direction of the platen 18 was reversed. With the platen 18 in the retracted position organic foliage introduced to the feed tube 12 can once again fall or otherwise be positioned generally between the platen 18 and the second end 10b of the compacting tube 10. When the platen 18 is adjusted to its extended position this organic foliage is again urged towards the second end 10b of the compacting tube 10, eventually coming into contact with the organic debris urged into the contact tube 10 during the previous adjustment of the platen 18 to its extended position. This contact between the organic foliage within the compacting tube 10 compacts the organic foliage together to form a bale of organic foliage that approximates the interior shape of the compacting tube 10. This reciprocating action of the platen 18 continues as organic foliage is introduced to the feed tube 12 to be compacted into the bale that eventually is discharged from the second end 10b of the compacting tube 10.

Although an exemplary embodiment of the foliage compactor 1 is described above, any configuration of hydraulic cylinder, control valves, hydraulic pumps, conduit, manifolds and the like may be chosen with sound engineering judgment. It is also noted here that other means for driving the platen 18 may include but is not limited to hydraulics, pneumatics, mechanical gear boxes and the like. The engine 20, as mentioned earlier, may be an internal combustion engine 20 that provides power to drive the hydraulic pump 40 supplying the hydraulic cylinder or other driver 15. In this manner, the mobile foliage compactor 1 may be self-contained to provide power required for operation. In that the use and operation of internal combustion engines is well known in the art, no further explanation will be offered at this time.

Organic foliage introduced adjacent to the first end 12a can fall between the platen 18 while it is in its retracted position (shown in solid lines in FIG. 2) and the second end 10b of the compacting tube 10. As the platen 18 is cycled forward toward its extended position (shown as broken lines in FIG. 2) the organic foliage is compacted within the compacting tube 10 due to laterally, vertically, or both laterally and vertically applied forces imparted by the top and bottom portions 25, 26 and lateral side portions of the housing forming the compacting tube 10 between the first and second ends 10a, 10b. And again, the organic foliage is compacted as it is pushed by the platen 18 from the first end 10a of the compacting tube 10 towards the second end 10b of the compacting tube 10 without squeezing the organic foliage between the platen 18 and another platen or other surface that is substantially parallel to, and in line with the platen 18. In other words, the foliage compactor 1 lacks a surface that is substantially parallel to the platen 18 against which the organic foliage is pressed to compact the organic foliage as the platen 18 pushes the organic foliage towards the second end 10b of the compacting tube 10. Instead, it is the resistance to the organic foliage's movement from the first end 10a to the second end 10b imparted by the housing of the compacting tube 10 extending between the first and second ends 10a, 10b that allows the organic foliage to be compacted while being pushed by the platen 18 results from the compression of the organic foliage between a top portion 25 and a bottom portion 26 of the compacting tube 10. The compressive force can optionally be exerted on the organic foliage by any combination of the side walls 25a, 25b of the top portion 25 and the side walls 26a, 26b of the bottom portion 26, and any other surface of the top and bottom portions 25, 26, which are shown best in FIG. 3. The second end 10b of the compacting tube 10 is open, or it can optionally be provided with an unbiased door that does not impart a significant compacting force against the organic foliage while being pushed by the platen 18, but merely to prevent the entrance of foreign debris from the compacting tube 10 through the second end 10b.

The process of compacting the organic foliage in the compacting tube 10 without the use of another platen 18 or other surface that is substantially parallel to the platen 18 is referred to herein as a substantially steady-state process. As a substantially steady-state process the compaction of organic foliage into bales is substantially continuous, and not a batch process that requires periodic interruption of the foliage compactor's operation to remove compacted organic foliage from the foliage compactor 1 before additional organic foliage can be compacted.

Figure 3:
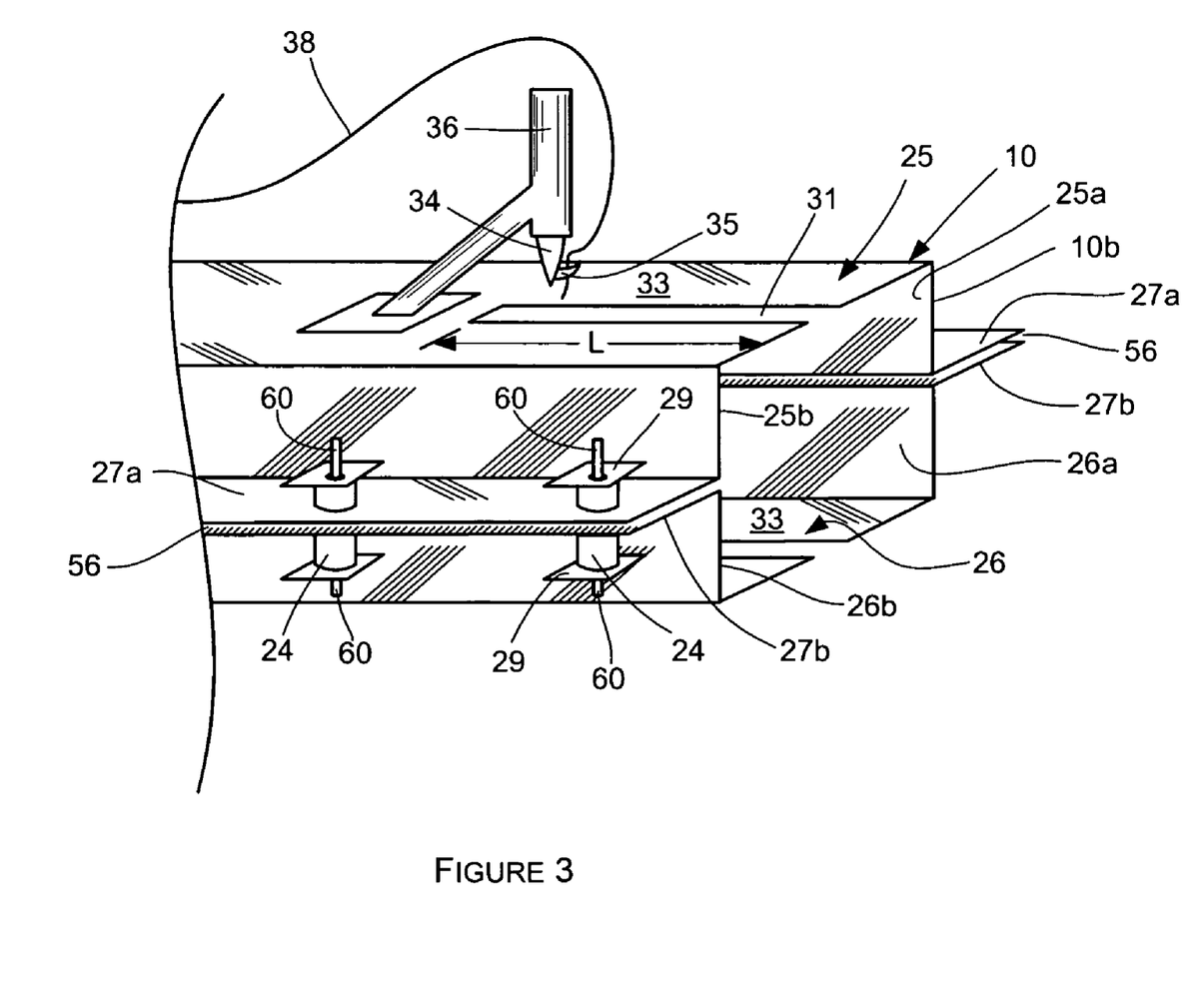
FIG. 3 is a perspective view of a portion of a compacting tube in accordance with an aspect of the present invention.

FIG. 3 shows an illustrative embodiment of the top and bottom portions 25, 26 of the compacting tube 10, with a gap 56 formed between the top and bottom portions 25, 26 of the compacting tube 10. The gap 56 can extend lengthwise along a portion of the compacting tube 10 as shown in FIG.

1, or can extend along the entire length of the compacting tube 10 if desired. A flange 27a extends outwardly generally away from each of the side walls 25a, 25b of the top portion 25, and a similar flange 27b extends outwardly generally away from each of the side walls 26a, 26b of the bottom portion 26. The flanges 27a are substantially parallel to, and aligned with the respective flanges 27b. The gap 56 is formed between the flanges 27a and the respective flanges 27b.

A rod 60 extends through a pair of aligned apertures formed in adjacent flanges 27a, 27b. One or both terminal ends of each rod 60 can be externally threaded to cooperate with compatible internal threading provided to a bracket member 29. A spring 24 is to be secured between each bracket member 29 and its respective flange 27a or 27b. Optionally, at least one spring 24 can be secured between each flange 27a, 27b and a respective bracket member 29, or there can be a plurality of springs 24 secured between each flange 27a, 27b and their respective bracket members 29, as shown in FIG. 3. The force imparted by the spring(s) 24 on the flanges 27a, 27b urges the top and bottom portions 25, 26 toward each other and away from the bracket member(s) 29. The magnitude of the force exerted by a spring 24 with a given length, and accordingly, the force with which the top and bottom portions 25, 26 are urged together can be adjusted by altering the distance along the rod 60 that separates each bracket member 29 from its respective flange 27a or 27b. For embodiments where the rod 60 is threaded, this can be accomplished by rotating each bracket member 29 about its respective rod 60 in the appropriate direction to bring each bracket member 29 closer to its respective flange 27a or 27b.

Figure 4A:
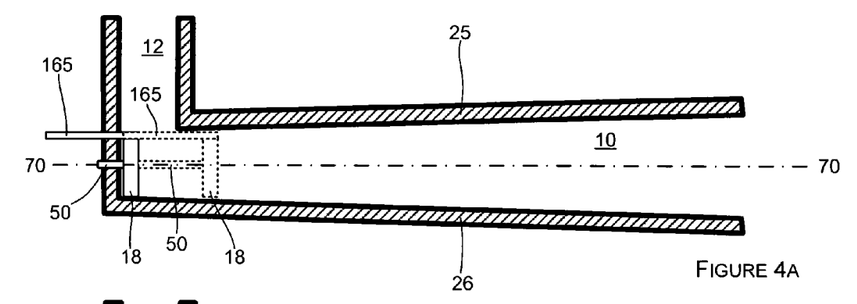
FIGS. 4A-4C are cutaway views of a feed tube and a contacting tube in accordance with an aspect of the present invention.
Figure 4B:
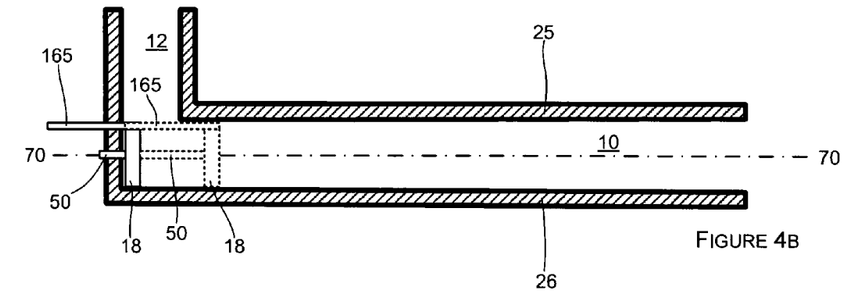
Figure 4C:
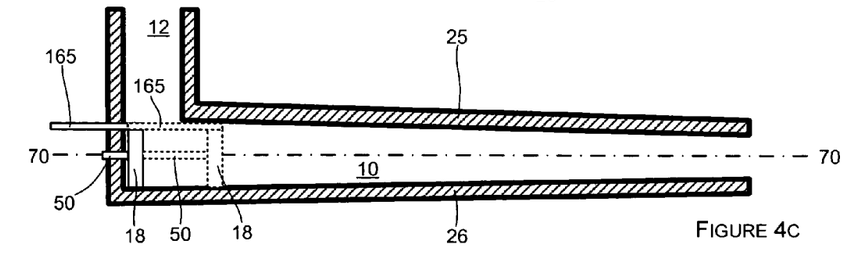

The density of the bales of organic foliage formed by the foliage compactor 1 can be adjusted as desired by adjusting the force with which the top and bottom portions 25, 26 are urged together as described above. The greater the force with which the top and bottom portions 25, 26 are urged together, the greater the resulting density of the bales of organic foliage produced by the foliage compactor 1 will be. FIGS. 4A-4C illustrate various configurations of the top and bottom portions 25, 26 based at least in part on the urging force imparted by the springs 24 on the flanges 27a, 27b. According to the embodiment shown in FIG. 4A, the bracket members 29 are adjusted close to their furthermost distance from their respective flanges 27a, 27b. Accordingly, the force imparted by the springs 24 urging the top and bottom portions together is minimal, thus allowing the top and bottom portions 25, 26 to taper generally away from each other from the first end 10a to the second end 10b of the compacting tube 10 along axis 70. The embodiment in FIG. 4A will result in the formation of bales having the least density, or degree of compaction of any of the embodiments shown in FIGS. 4A-4C due primarily to the expanding, or diverging taper angle of the compacting tube 10 along axis 70. However, the density of the bales produced by the foliage compactor 1 embodiment shown in FIG. 4A is sufficient for the bales to maintain their shape upon exiting the foliage compactor 1.

According to the embodiment shown in FIG. 4B, the bracket members 29 are adjusted to their approximate midpoint along their allowable range of travel. This midpoint is approximately midway between their furthermost position along rod 60, where they are the furthest from the flanges 27a, 27b, and their innermost position along rod 60, where they are the closest to the flanges 27a, 27b. Accordingly, the force imparted by the springs 24 urging the top and bottom portions 25, 26 together with the bracket members 29 at their approximate midpoints is suitable for establishing an approximately parallel arrangement between the top and bottom portions 25, 26 of the compacting tube 10. In the approximately parallel arrangement, the perpendicular distance between the top and bottom portions 25, 26 is approximately the same throughout the entire length of the compacting tube 10 along axis 70. The embodiment illustrated in FIG. 4B will result in the formation of bales having an average density, or degree of compaction, of any of the embodiments shown in FIGS. 4A-4C due primarily to the neutral taper of the compacting tube 10 along axis 70. Again, the density of the bales produced by the foliage compactor 1 embodiment shown in FIG. 4B is sufficient for the bales to maintain their shape upon exiting the foliage compactor 1.

According to the embodiment shown in FIG. 4C, the bracket members 29 are adjusted close to their innermost position along their allowable range of travel. In the innermost position, the bracket members 29 are located along rod 60 at the closest position possible to their respective flanges 27a, 27b. As such, the force imparted by the springs 24 urging the top and bottom portions 25, 26 together with the bracket members 29 at their innermost position is suitable for urging the top and bottom portions 25, 26 generally toward each other from the first end 10a to the second end 10b of the compacting tube 10a along the axis 70. The constricting taper formed by such an arrangement of the top and bottom portions 25, 26 shortens the perpendicular distance between the top and bottom portions 25, 26 progressively from the first end 10a to the second end 10b of the compacting tube 10 along the axis 70. The embodiment illustrated in FIG. 4C will result in the formation of bales having the greatest density, or degree of compaction, of any of the embodiments shown in FIGS. 4A-4C due primarily to the constricting taper of the compacting tube 10 along the axis 70. Accordingly, such bales will include the most organic foliage of any equally-sized bales produced by any of the embodiments shown in FIGS. 4A-4C.

The density of the bales produced by the embodiments shown in FIGS. 4A-4C is a function of the taper angle of the compacting tube 10 along the axis 70. The closer the taper angle approximates the constricting taper shown in FIG. 4C, the more resistance the organic foliage encounters as it is pushed by the platen 18 through the compacting tube 10 toward the second, open end 10b thereof. In a sense, the motion of the organic foliage is bottlenecked as it advances through the compacting tube 10. In other words, the same amount of organic foliage passes through the constricted second end 10b of the compacting tube 10 that passes through the wider first end 10b, at approximately the same speed. The end result is a greater compacting pressure applied by the top and bottom portions 25, 26 on the organic foliage adjacent to the second end 10b than at the first end 10a of the compacting tube 10.

Use of the foliage compactor 1 will be initially described with reference to the embodiment shown in FIGS. 1 and 2. The embodiment of the foliage compactor 1 shown in FIG. 1 is adapted to have organic foliage fed into a hopper 72 to be compacted into bales. The hopper 72 is oriented vertically such that an open end, or outermost aperture, through which the organic foliage is fed is facing upwardly, in a direction generally away from the ground on which the foliage compactor 1 rests. The outermost aperture of the hopper 72 can be shaped to offer operators a large opening into which organic foliage can be introduced to the foliage compactor 1, while funneling the organic foliage into the feed tube 12.

The aperture in the feed tube through which organic foliage is transferred from the hopper 72 into the feed tube 12 is smaller than the outermost aperture, thereby giving the hopper 72 its funnel shape. From the hopper 72, the organic foliage falls under the force of gravity into the first end 10a of the compacting tube 10 between the platen 18 in its retracted position (shown in solid lines in FIG. 2) and the second end 10b of the compacting tube 10.

When compaction of the organic foliage is desired, actuation of the platen 18 by the hydraulic cylinder or other type of driver 15 can be manually commenced by the operator with a user interface such as a button, lever, and the like. The hydraulic cylinder 15 forces the platen 18 from its retracted position to its extended position (shown in broken lines in FIG. 2), thereby forcing the organic foliage from the first end 10a towards the second end 10b of the compacting tube 10. In the embodiment shown in FIG. 2, the constricting taper of the compacting tube 10 exerts significant resistance to the motion of the organic foliage there through, resulting in a high-density bale. But again, a compacting tube 10 having an expanding taper such as that shown in FIG. 4A provides sufficient resistance to the motion of organic foliage through the compacting tube 10 to compact said foliage into a bale that can maintain its shape upon being removed from the foliage compactor. As each bale exits the second end 10b of the compacting tube 10, it can be ejected onto an optional platform 74 for temporarily supporting the bales while being bound by the binding cord 38.

To bind the bales according to the embodiments shown in FIGS. 1 and 2, the operator can actuate the binder 46 to extend the binding cord 38 through the bale, from where it can be wrapped around a leading end of the bale and tied to a segment of the binding cord 38 suspended from the spool 47. The hydraulically-actuated rod 34 is forced from within its sleeve 36, through the slit 31 formed in the top portion 25, through the bale, and out through the slit 31 formed in the bottom portion 26. Once the rod 34 extends beyond the bale, the binding cord 38 is removed from the hook portion 35 and wrapped around the leading edge of the bale. Once the binding cord 38 has been so wrapped around the bale, it is tied to itself and the cut from the spool 47. The bound bale can now be removed from the foliage compactor 1 and transported to a suitable vehicle or disposal location.

Feeding organic foliage through the hopper 72 as described with reference to FIGS. 1 and 2 is but one illustrative manner of charging the foliage compactor 1 of the present invention. According to the embodiment shown in FIG. 5, the foliage compactor 1 can optionally be equipped with a vacuum source 51, such as a vacuum pump, for establishing a vacuum at the entrance adjacent to the feed tube 12 to suck or otherwise inhale organic foliage into the feed tube 12. The vacuum source 51 can optionally be operatively coupled to the engine 20 to generate the vacuum required to inhale organic foliage into the feed tube 12. A flexible foliage conduit 52 with a first end 52a and a second end 52b can be coupled adjacent to the first end 12a of the feed tube 12, and optionally to the hopper 72, thereby allowing rapid conversion of the foliage compactor 1 between the hopper-fed configuration and the vacuum-fed configuration. The foliage conduit 52 is suitably long to extend from the first end 12a of the feed tube 12 to the surrounding ground region in proximity to the foliage compactor 1. Any length of foliage conduit 52 may be chosen with sound engineering judgment as is appropriate for use with the present invention. Further, the foliage conduit 52 is formed from a generally non-porous material to prevent a loss of the vacuum from occurring through the foliage conduit 52.

Figure 5:
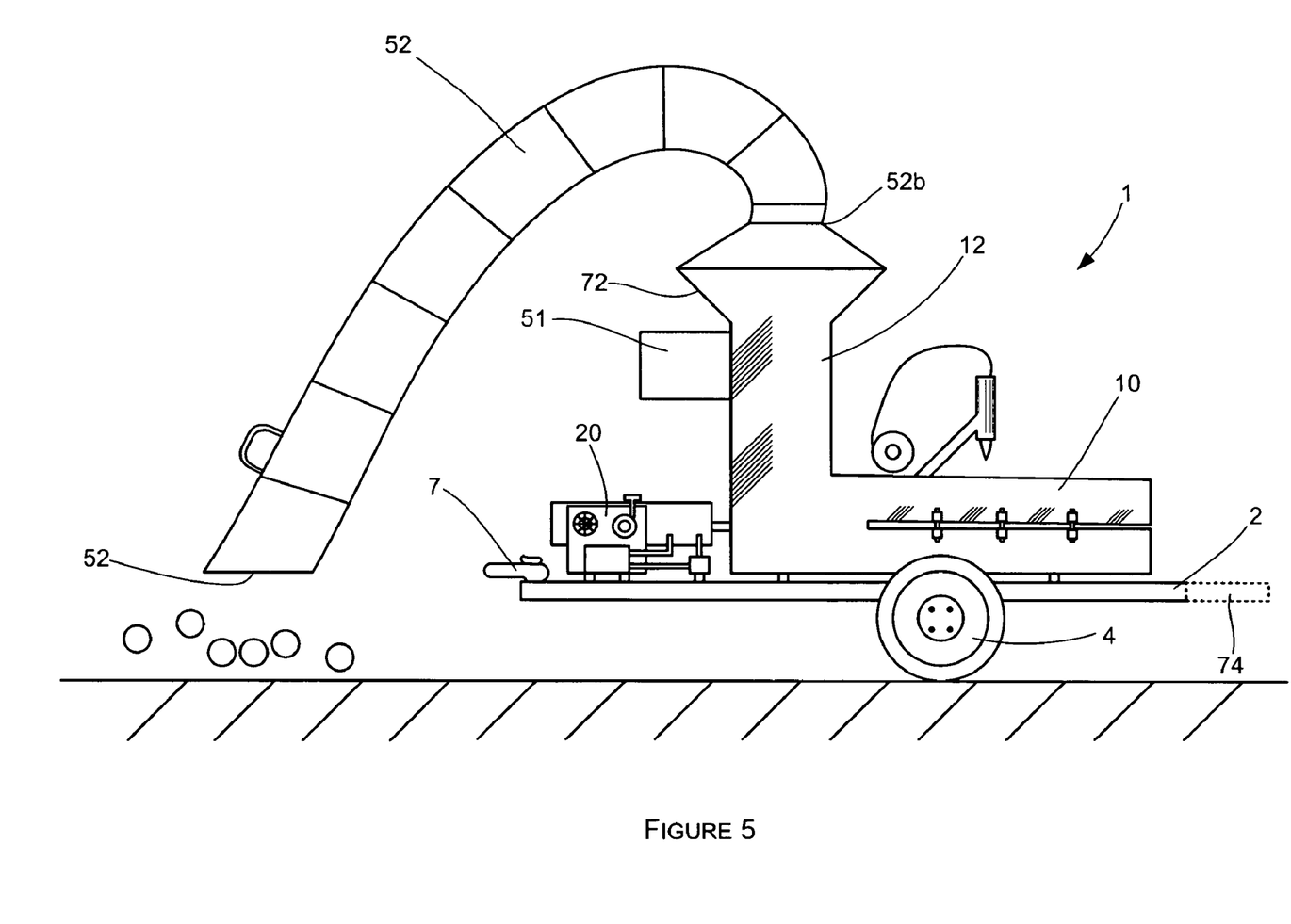
FIG. 5 is a side view of a foliage compactor that is vacuum charged in accordance with an aspect of the present invention.

The vacuum pump 51 is operatively coupled to the foliage feed tube 52, and is optionally powered to operate from the onboard engine 20, making the foliage compactor self sufficient, meaning that all necessary energy can be generated on board to operate the foliage compactor 1 as a stand alone unit. Thus, embodiments of the foliage compactor 1 can generate all necessary power needed for operation from the engine 20, and without support from extraneous devices. According to an alternate embodiment, an electrical generating device, such as an alternator, not shown, may be included that converts power from the engine 20 into electrical energy that may be utilized to power the vacuum pump 51. However, any means of providing or converting power to operate the vacuum pump 51 may be chosen with sound engineering judgment.

Yet another alternate embodiment of the foliage compactor 1 includes a foliage conduit 52 operatively coupled in fluid communication between the feed tube 12 and an output of a mower deck 76 provided to the tow vehicle 41, which can be a conventional riding lawn tractor, as shown in FIG. 6. The foliage compactor 1 can be connected via the hitch 7 to the tow vehicle such that the foliage conduit 52 extends from the mower deck 76 to a booster 78. The booster 78 can be a blower, a vacuum pump, any other device for feeding organic foliage expelled from the mower deck 76 into the feed tube 12, or any combination thereof. Just as before, the booster 78 can be powered by kinetic or electric energy generated from the engine 20 provided to the foliage compactor 1, or it can be powered by the tow vehicle 41 by extending an electrical conductor or power take off ("PTO") unit (not shown) from the tow vehicle 41 to the foliage compactor 1.

FIG. 6 also illustrates an alternate embodiment of the binder 146. In use, the arcuate arm 134 that is pivotally mounted to an underside of the frame 2 is hydraulically activated to pivot and inject the point at the arm's leading end upward through the slit 31, through the bale, and then out through the slit 31 formed in the top portion 25 of the compacting tube 10. When the point at the end of the arm 134 breaches the uppermost surface of the bale, the binding cord 138 coupled thereto can be tied to a portion of the string extending about the bale from the spool 147 to hold the bale's shape and facilitate manual handling of the bale. Unlike the embodiment shown in, and described with reference to FIG. 3, the embodiment shown in FIG. 6 does not require the operator to manually pull significant lengths of the binding cord 138 through the bale to be tied off. Instead, the point of the arcuate arm 134 exits the bale adjacent to a location where the spool 147 is supported on the foliage compactor 1. Thus, the binding cord 138 can be tied relatively close to a location where the point of the arcuate arm 134 exited the bale with ease, and without retrieving the binding cord 138 from beneath the foliage compactor 1.

Illustrative embodiments have been described, hereinabove. It will be apparent to those skilled in the art that the above devices and methods may incorporate changes and modifications without departing from the general scope of this invention. It is intended to include all such modifications and alterations in so far as they come within the scope of the appended claims.

What is claimed is:

1. An organic foliage compactor for compacting organic foliage into a bale, the compactor comprising:
    a compactor frame;
    at least one ground engaging wheel operatively coupled to the compactor frame for transporting the compactor to a desired location;
    a hitch fixedly connected to a first end of the compactor frame for use in selectively attaching the compactor to a tow vehicle;
    a compacting tube coupled to a top of the compactor frame, the compacting tube including a first end, a second end and a housing that defines an interior passage extending between the first end and the second end through which the organic foliage is urged to compact said organic foliage;
    wherein the compacting tube has a top portion and a bottom portion, and the top portion and the bottom portion are at least partially separated by an adjustable gap;
    a force that urges the top and bottom portions together wherein the gap can be adjusted by adjusting the force;
    a feed tube to which the organic foliage is to be introduced in communication with the compacting tube and the feed tube is connected to a top of the compacting tube;
    a driver for providing an urging force to be imparted on organic foliage introduced to the feed tube;
    a platen operatively coupled to the driver for urging organic foliage introduced to the feed tube into the compacting tube where it is compacted as the organic foliage progresses through the interior passage defined by the housing between the first end and the second end of the compacting tube as a substantially steady-state process;
    a control device to control a direction in which the platen travels relative to the compacting tube; and
    a binder for inserting a binding cord through a bale to be discharged from the compacting tube;
    wherein the binder includes a hydraulically-actuated arm that is pivotally mounted on an underside of the frame, and the arm is hydraulically driven by a hydraulic cylinder that is coupled to the underside of the frame;
    wherein at least a portion of the hydraulically-actuated arm pierces the bale of organic foliage and extends at least a portion of a binding cord through the bale.

2. The organic foliage compactor according to claim 1, wherein the driver is a hydraulic cylinder and the platen is operatively coupled adjacent to an end of a piston that can extend from and retract at least partially into the hydraulic cylinder.

3. The organic foliage compactor according to claim 2 further comprising:
    an on-board internal combustion engine including at least one power output; and
    a hydraulic pump operatively coupled to the at least one power output of the internal combustion engine to pump hydraulic fluid into the hydraulic cylinder.

4. The organic foliage compactor according to claim 2, wherein the control device is a bidirectional hydraulic control valve that causes reciprocation of the piston within the hydraulic cylinder between retracted and extended positions.

5. The organic foliage compactor according to claim 4, wherein the reciprocation of the piston within the hydraulic cylinder caused by the control valve is repeated automatically without intervention by an operator.

6. The organic foliage compactor according to claim 1 further comprising
    a vacuum source operatively coupled to the organic foliage compactor, the vacuum pump having a vacuum input through which the organic foliage is inhaled and a vacuum output in fluid communication with the feed tube through which inhaled organic foliage is discharged and introduced to the feed tube.

7. The organic foliage compactor according to claim 1, wherein the driver is a hydraulic cylinder to be operatively coupled in fluid communication with a hydraulic pump, the hydraulic cylinder comprising a hydraulic piston disposed at least partially within the hydraulic cylinder that is adjustable between an extended position and a retracted position relative to the cylinder.

8. The organic foliage compactor according to claim 1 further comprising
    a foliage conduit extending between a first end in communication with the feed tube and a second end to be coupled to an output of a mower deck provided to a lawn tractor to transport organic foliage discharged from the output of the mower deck to the feed tube.

9. The organic foliage compactor according to claim 8 further comprising
    a booster for transporting organic foliage that would not otherwise reach the feed tube through the foliage conduit into the feed tube from the foliage conduit.

10. The organic foliage compactor according to claim 9, wherein the booster is a blower, a vacuum pump, or a combination of a blower and a vacuum pump.

11. The organic foliage compactor according to claim 1 further comprising
    an open-ended hopper provided to the feed tube through which organic foliage can be introduced to the feed tube.

12. The organic foliage compactor according to claim 11, wherein the hopper includes a tapered shape with an outermost aperture through which organic foliage is introduced to the foliage compactor is larger than an inner aperture in communication with the feed tube through which organic foliage enters the feed tube.

13. The organic foliage compactor according to claim 1, wherein the compacting tube has an adjustable taper angle for varying a density of a bale of organic foliage to be discharged by the foliage compactor.

14. The organic foliage compactor according to claim 1, wherein the compacting tube includes a taper angle that diverges along a length of the compacting tube in a direction extending generally from the first end of the compacting tube to the second end of the compacting tube.

15. The organic foliage compactor according to claim 1, wherein the compacting tube includes a taper angle that converges along a length of the compacting tube in a direction extending generally from the first end of the compacting tube to the second end of the compacting tube.

* * * * *